Jan. 29, 1963 J. W. BRANDL 3,075,452
DOMESTIC HOT BEVERAGE MAKING APPLIANCE
Filed Feb. 16, 1961
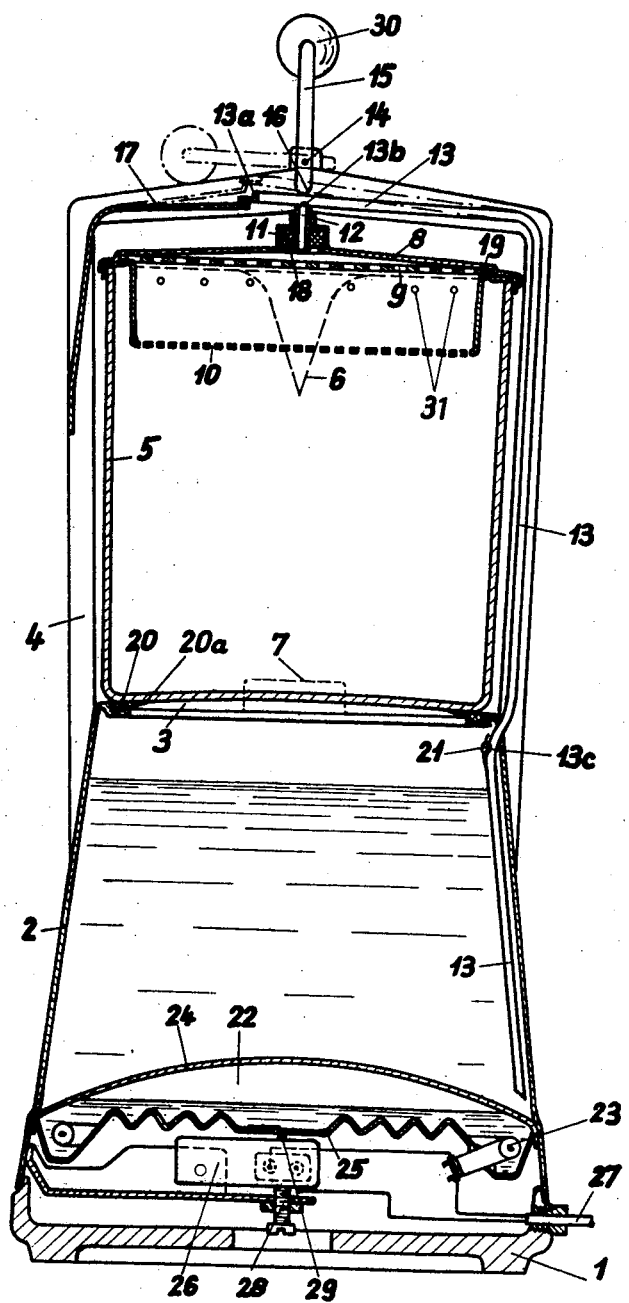

United States Patent Office 3,075,452
Patented Jan. 29, 1963

3,075,452
DOMESTIC HOT BEVERAGE MAKING APPLIANCE
Joseph Wilhelm Brandl, 12 Schurbungert, Zurich, Switzerland
Filed Feb. 16, 1961, Ser. No. 89,690
Claims priority, application Switzerland Feb. 19, 1960
11 Claims. (Cl. 99—281)

The present invention relates to a domestic hot beverage making appliance, for example a coffee percolator or tea pot.

It is the primary object of the invention to provide an appliance of the kind referred to which is automatically safeguarded against overheating by running dry.

It is another object of the invention to provide an appliance which prevents luke-warm water from coming into contact with the ground coffee or the tea leaves and from spoiling the aroma of the beverage, and which allows the preparing of small quantities, for example of one cup only, of a hot beverage, by ensuring that boiling water only comes into contact with the ground coffee or the tea leaves from the outset.

On the other hand it is an object of the invention to prevent overheating the ground coffee or tea leaves, which is likewise detrimental to the aroma of the beverage.

It is also an object of the invention to speed up the operation of brewing the beverage.

With these and other objects in view which will become apparent later from this specification and the accompanying drawing, provide a domestic hot beverage making appliance comprising in combination: a water container having a filling aperture, a beverage container in operation superimposed on the said aperture, a lid of the said beverage container having a filter insert, a heating element having a sealed vessel in operation evacuated and partly filled with a liquid, said vessel having an upper wall forming at the same time the bottom of said water container, and a pressure-sensitive diaphragm forming the bottom of said vessel, an electric heating coil arranged in said vessel in operation submerged in said liquid therein and a pressure responsive switch within operative range of said diaphragm and electrically connected to the said heating coil and automatically switching the same off in response to a predetermined pressure from said diaphragm.

These and other features of my invention will be clearly understood from the following description of a preferred embodiment thereof given by way of example with reference to the accompanying drawing showing a vertical section of a coffee percolator according to the present invention.

On a base 1 the sheet metal shell of a water container 2 is attached which has on top an aperture 3. A U-shaped hollow yoke 4 is arranged on the shell of the water container. Between the arms of the yoke a beverage container 5 of glass or the like is superimposed on the water container. The beverage container 5 is provided with a discharge spout 6 and a handle (not shown) which allows its easy insertion between the arms of the yoke 4. On the beverage container 5, a filter insert 10 and a lid (cover) 8 are mounted. Lid 8 includes a distributor spray 9 in the form of a perforated sheet insertion. Filter insert 10 serves to receive the coffee powder or the tea leaves. In the middle of the lid 8 a connector piece 11 having a short tube 12 is arranged. The hollow yoke 4 moreover contains a tube 13, one open end of which reaches almost to the bottom of the water container 2, while its other, closed, end 13a extends in the yoke 4 beyond the central axis of the appliance. At the point where the upper part of tube 13 intersects the central axis of the appliance, the tube 13 is drilled to provide an opening or bore 13b; the upper end of short tube 12 is disposed in alignment with bore 13b in order to establish communication therebetween whereby the upward stream of hot water in tube 13 flows through the bore 13b into the tube 12 and thence through the holes of the spray 9 into the filter insert 10. At the highest point of the yoke 4 there is moreover arranged a clamping device in the form of a rocker lever 15 pivotally mounted about an axle 14. This lever has an eccentric 16 acting on the tube 13. The end of the tube 13 mounted resiliently movable in the yoke 4. When the rocker lever 15 is in the horizontal position shown in dotted lines, the end of the tube is biased by a leaf spring 17 arranged in the yoke 4 upwards into the position shown in dotted lines. In this position the beverage vessel 5 with the filter and lid put on may be readily inserted. Thereafter the rocker lever 15 is turned into the position shown in full lines.

The eccentric 16 then forces the tube 13 against the connector piece 11 in such a manner that the bore 13b is pressed on to the small tube 12. In the connector piece 11 and between the lid 8 and filter 10 seals 18, 19 are provided. Moreover between the water container 2 and the beverage container 5 a sealing ring 20 is arranged, which has a sealing lip 20a, tightly contacting the glass of the container 5 under the effect of the pressure in the water container. The water container is thus connected by the tube 13 in a pressure-proof manner to the filter insert 10, while the beverage container 5 is in communication with the ambient atmosphere through the discharge spout 6.

In the wall of the lower part of tube 13, a small bore 13c is provided at the point where it passes from the water container 2 into the yoke 4 which bore is covered by a leaf spring 21 acting as a valve.

For heating up the water container in the water container 2 an electric heating element 22 is provided. The latter consists in a sealed vessel partly filled with water, and evacuated. It contains moreover an electric heating coil 23. The upper wall 24 of the vessel forms the bottom of the water container 2, while the lower wall of the vessel is designed as a pressure-sensitive diaphragm 25. The latter co-operates with an electric switch 26, which switches the heating current on and off.

The manner of functioning of the appliance is as follows: the water container 2 is filled with water of a predetermined amount according to the desired volume of water (however the water level should not be above the bore 13c), and the filter insert 10 is filled for example with coffee powder. The empty beverage container 5 is inserted on top of the water container and is clamped fast by turning the rocker lever 15. Then the electric cable 27 is connected to a current source. The heating coil 23 heats up the water container in the heating element 22 which water evaporates immediately since the vessel of the heating element 22 is evacuated. The heat passes through the upper wall 24 of the vessel and heats the water in the vessel 2. In the heating element 22 pressure is generated corresponding to the temperature and acting on the diaphragm 25 forcing the same downward. The switch 26 is adjusted by means of a screw 28 in such a manner that the diaphragm when reaching a temperature of about 105° C. bears so strongly on the button 29 of the switch 26 that the heating current is interrupted.

As soon as the water in the vessel 2 begins to boil and evaporation begins, it is forced through the tube 13 on to the small tube 12 into the filter insert 10. The coffee then flows out of the same into the beverage vessel 5.

The bore 13c with leaf spring 21 is a venting device and has the object of preventing forcing luke warm water into the filter insert by the expanding air before the water reaches the boiling point since this would be detrimental to the aroma of the coffee. The leaf spring 21 constitutes a spring biased valve which is not airtight but which prevents the release of large amounts of water through the tube 13. During the initial warming up of the water in container 2, the air above the water level becomes heated and thus expands. This air can then pass into the surrounding air by way of a path traced from bore 13c through tube 13, bore 13b, tube 12, holes 31 and the unsealed outlet 6. Inasmuch as the water in container 2 is rapidly boiling, the aperture 13c is too small to release all the pressure; the hot water will then be forced through the lower open end of tube 13 into the filter insert 10. The bore 13c obtains the desired result of preventing the water from being forced into the filter insert by the increased pressure of the expanding air during the heating operation before the water commences to boil. Accordingly a pressure equilibrium is established between the interior of the tube 13 and the vessel 2. In practical operation it has been found, that this venting device operates faultlessly even without a leaf spring 21.

Moreover it has been found convenient to arrange passages for the emergence of steam in the portion of the appliance downstream of this venting device. Preferably these passages are provided in the filter in such a manner that they are designed as perforations 31 in the side walls of the filter. Thereby it is attained that the water, as intended, flows over the coffee powder contained in the filter, but the steam is discharged. In spite of the steam discharge passages 31, some pressure—albeit low—is maintained in the region of the filter so that the filtering is yet carried out more quickly than in the known open filter system. Thereby a substantial improvement in the quality of the coffee is attained.

The coffee percolator described has the advantage of safety against running dry. Since the heating element switches itself off automatically at a predetermined temperature or predetermined pressure, respectively, no overheating can occur when there is no more water in the vessel 2. The appliance therefore does not require any supervision and operates fully automatically.

The arrangement has moreover the advantage that the beverage container is preheated by the water warming up in the container 2, before itself being filled.

The rocker lever 15 may be provided with a heat-insulting handle 30 which allows the hot appliance readily to be carried.

While I have herein described and illustrated in the accompanying drawing what may be considered a typical and particularly useful embodiment of my said invention I wish it to be understood that I do not limit myself to the particular details and dimensions described and illustrated; for obvious modifications will occur to a person skilled in the art.

What I claim as my invention and desire to secure by Letters Patent, is:

1. A domestic hot beverage making appliance comprising in combination: a water container having a filling aperture, a beverage container superimposed on said water container to close the said aperture, a lid for the said beverage container having a filter insert, a heating element having a sealed vessel evacuated of air and partly filled with a liquid, said vessel having an upper wall forming at the same time the bottom of said water container, and a pressure-sensitive diaphragm forming the bottom of said vessel, an electric heating coil submerged in the liquid in said vessel and a pressure-responsive switch within operative range of said diaphragm.

2. A domestic hot beverage making appliance as claimed in claim 1, comprising a sealing gasket inserted between the said lid and the said filter insert.

3. A domestic hot beverage making appliance as claimed in claim 1, comprising a sealing gasket disposed on said water container around the said aperture and being contacted by the superimposed beverage container to sealingly close the said aperture.

4. A domestic hot beverage making appliance as claimed in claim 1, comprising in addition:
a U-shaped yoke mounted on said water container and embracing the said beverage container, and a clamping device mounted on said yoke and being operative to clamp the said beverage container on the said water container.

5. A domestic hot beverage making appliance as claimed in claim 4, wherein the said U-shaped yoke is hollow and contains on overflow tube extending towards the bottom into the said water container.

6. A domestic hot beverage making appliance as claimed in claim 5, wherein the said clamping device comprises a rocker lever pivotally mounted on said yoke, and an eccentric operatively connected to the said rocker lever for movement thereby into engagement with said overflow tube.

7. A domestic hot beverage making appliance as claimed in claim 6, comprising a tubular connector piece connecting the said lid to a bore provided on the underside of said overflow tube in the axis of the said appliance, a pressure-tight connection being established between said overflow tube and the said filter insert through the said tubular connector piece by the said overflow tube being pressed against it by the said eccentric.

8. A domestic hot beverage making appliance as claimed in claim 6, comprising a heat insulating carrier grip arranged on the free end of the said rocker lever.

9. A domestic beverage making appliance comprising in combination: a water container having a filling aperture, a beverage container superimposed on said aperture, a lid for said beverage container having a filter insert, an overflow tube leading from the interior of said water container to the said filter insert, a venting device arranged in the upper part of said water container on the said overflow tube for balancing the pressure within said overflow tube and the said water container, a heating element having a sealed vessel evacuated of air and partly filled with a liquid, said vessel having an upper wall forming at the same time the bottom of the said water container and a pressure-sensitive diaphragm forming the bottom of the said vessel, an electric heating coil arranged in said vessel and being submerged in said liquid, and a pressure responsive switch electrically connected to said heating coil and within operative range of the said diaphragm, the said switch switching the said heating element off in response to a predetermined pressure applied to said switch by the said diaphragm.

10. A domestic hot beverage making appliance as claimed in claim 9, wherein discharge passages for steam are arranged in the part of the said appliance downstream of the said venting device.

11. A domestic hot beverage making appliance as claimed in claim 10, wherein the said passages are designed as perforations in the said filter insert.

References Cited in the file of this patent

UNITED STATES PATENTS

| 2,268,633 | Aske | Jan. 6, 1942 |
| 2,983,217 | Gill | May 9, 1961 |
| 2,987,605 | Brandl | June 6, 1961 |

FOREIGN PATENTS

| 375,784 | Italy | Oct. 24, 1939 |